US005456725A

United States Patent [19]
Bruhnke

[11] Patent Number: 5,456,725
[45] Date of Patent: Oct. 10, 1995

[54] METHOD FOR TEMPORARILY COLORING TEXTILE FIBERS

[75] Inventor: John D. Bruhnke, Spartanburg, S.C.

[73] Assignee: Milliken Research Corporation, Spartanburg, S.C.

[21] Appl. No.: 206,126

[22] Filed: Mar. 4, 1994

[51] Int. Cl.$^6$ .................................................. D06P 5/13
[52] U.S. Cl. ..................... 8/403; 8/647; 8/924; 8/929; 8/933; 534/729
[58] Field of Search ................................ 8/929, 403, 647, 8/924, 933; 534/729

[56] References Cited

U.S. PATENT DOCUMENTS

| | | | |
|---|---|---|---|
| 3,157,633 | 11/1964 | Kuhn | 260/200 |
| 4,594,454 | 6/1986 | Moore et al. | 564/305 |
| 4,758,243 | 7/1988 | Rekers et al. | 8/627 |
| 4,871,371 | 10/1989 | Harris | 8/403 |
| 4,877,411 | 10/1989 | Hines et al. | 8/403 |
| 4,981,516 | 1/1991 | Kluger et al. | 106/22 |
| 5,071,440 | 12/1991 | Hines et al. | 8/403 |
| 5,240,464 | 8/1993 | Kluger et al. | 8/506 |

*Primary Examiner*—Margaret Einsmann
*Attorney, Agent, or Firm*—Terry T. Moyer; Timothy J. Monahan

[57] ABSTRACT

A process for temporarily coloring a polyamide substrate is provided whereby a poly(oxyalkylene) substituted methine colorant is applied to the substrate followed by heating the substrate with superheated steam at a temperature of 250° F. or greater, which effectively decolorizes the methine colorant.

14 Claims, No Drawings

METHOD FOR TEMPORARILY COLORING TEXTILE FIBERS

BACKGROUND OF THE INVENTION:

The present invention relates to a method for providing temporary coloration to a polyamide textile fiber, with a heat degradable poly(oxyalkylene) substituted methine colorant.

Fugitive colorants which have achieved wide acceptance in the textile industry include the poly(oxyethylene) substituted colorants described in U.S. Pat. No. 3,517,633. These colorants or tints are used to identify fiber types by color coding undyed fiber during the textile manufacturing process and to enhance the visibility of the fibers. After the fiber is made into a textile product, for example after having been tufted into a substrate to make carpeting, the fugitive colorant is removed by scouring with an aqueous solution. These colorants are a combination of a dyestuff radical and one or more poly(oxyethylene) groups. Suitable dyestuff radicals disclosed in the patent include nitroso, nitro, azo, diphenylmethane, triarylmethane, xanthene, acridine, methine, thiazole, indamine, azine, oxazine and anthraquinone radicals. The dyestuff radical may be attached to the poly(oxyethylene) group by an amino nitrogen.

Normally, the fugitive colorants are applied to the fiber prior to heat setting. Textile fibers, especially thermoplastics such as nylon and polyester, are heat set during processing to provide bulk and texture to yarns made from the fibers. For example, in the Suessen process, nylon 6 continuous filament or staple fibers are dry heatset at 190° C. to 195° C. for 40 to 90 seconds. One of the advantages of the aforementioned poly(oxyethylene) substituted colorants is that they may generally be removed by scouring, even after such heat setting conditions.

The removal of fugitive colorants from fibers has become increasingly difficult with the development of wet heat setting processes which employ superheated steam, such as in the Superba process. It is believed that moisture from the saturated steam disrupts the hydrogen bonding network in the polyamide fiber, thereby lowering the softening temperature and increasing the crystallization rate of the polymer. Polyamide fiber, and in particular nylon 6 fiber, tends to swell slightly in high humidity and temperature, which allows penetration of the colorant into interstices in the fiber. Consequently, even colorants which are highly water soluble become bound to the fiber upon cooling and cannot be readily removed with traditional scouring techniques.

Also, with the advent of improved carpet dyeing techniques, such as the Kuster Dyer, scouring of the carpet with copious quantities of water is becoming unnecessary and, in fact, may be undesirable except for the necessity of removing the fugitive colorant. Furthermore, while conventional fugitive colorants have in the past generally been applied at levels below about 0.5% of colorant based upon the weight of the fiber, increasing tint levels are being used to maintain proper identification of fibers during processing. When conventional fugitive colorants are used at such higher levels, for example above about 0.5 wt % removal of all of the colorant may become increasingly difficult.

Poly(oxyalkylene) substituted methine colorants have been previously employed to color polyester materials, to color liquids containing nonionic surfactants and in washable ink compositions, as disclosed in the following United States patents. In Rekers, U.S. Pat. No. 4,758,243 a solution of a methine colorant is applied to a polyester fabric and the fabric is heated in a forced air oven at 190° to 210° C. for fifteen minutes. The colorant was found to penetrate into the polyester material. Aqueous and non-aqueous liquids containing a nonionic surfactant and a methine colorant are shown in U.S. Pat. No. 4,871,371. Suggested liquid compositions include cosmetics, inks, paper products, cleaning solutions, detergents, herbicides, gasoline, antifreeze, paint, plastics, and in the textile industry Finally, Kluger et al., U.S. Pat. No. 4,981,516 disclose washable ink compositions containing poly(oxyalkylene) substituted methine colorants.

All of the above identified United States patents are incorporated by reference.

SUMMARY OF THE INVENTION

Therefore, an object of the invention is to provide a method for temporarily coloring a textile fiber which is heat set with super heated steam. Another object of the invention is to provide a process for temporarily coloring polyamide fiber, especially nylon 6.

Still another object of the invention is to provide a method for temporarily coloring a textile fiber, where the colorant is soluble or readily dispersible in a wide variety of aqueous and non-aqueous liquids.

Accordingly, a process for temporarily coloring a polyamide textile fiber by applying from 0.01 to 3.0 wt. %, based on the weight of the fiber, of a poly(oxyalkylene) substituted methine colorant to the fiber, followed by heating the fiber with superheated steam to decolorize the methine colorant. The colorant is characterized by a C=C pair, with electron withdrawing groups bonded to one member of the pair and electron donating groups bonded to the other member.

The process has the advantage that when the colored fiber is subjected to conditions of high heat and saturated humidity, which have otherwise been found to bind a colorant to the fiber, the colorant undergoes a color loss and does not permanently tint the fiber.

DESCRIPTION OF THE PREFERRED EMBODIMENT OF THE INVENTION

Without limiting the scope of the invention, the preferred features of the invention are hereinafter set forth.

The present process has application to a broad range of polyamide textile fibers. By way of example, and not limitation, the process may be practiced with the following fibers: aramids, including poly(m-phenyleneisophthalamide), poly-(p-benzamide) and poly-(phenyleneterephthalamide) and nylons, including nylon 6, nylon 6,6, nylon 6,10, nylon 4 and nylon 11; copolymers and terpolymers of the monomers forming such nylons; and blends of polyamide fibers. Preferably, the fibers are selected from nylon 6 and nylon 6,6.

The fibers may be in the form of monofilament, continuous filament yarn, staple fibers or spun yarn. Alternatively, the fibers may be manufactured into a textile product such as woven or knitted fabric, nonwoven webs or felts, or carpet, carpet tiles or rugs. While it is preferable to employ the process with textile fibers and yarns, the invention is not so limited, and may be practiced on any substrate, such as molded objects made from the aforementioned thermoplastic materials.

The colorants employed in the process are poly(oxyalkylene) substituted methine colorants, characterized by a chromogen having a C=C pair, wherein the net effect of the groups bonded to one member of the pair is to donate electrons, and the net effect of the groups bonded to the opposite member of the pair is to withdraw electrons, with the proviso that the groups do not include a conjugated nitrogen bonded to one member of the C=C pair, and one of the electron donating groups is an aromatic or heteroaromatic group. Strong electron donating and withdrawing groups are preferred to facilitate subsequent decolorization of the chromogen. Examples of electron withdrawing groups include nitro, amido, halo, cyano, carbonyl, carboxy, alkyl ester, vinylic carbon, sulfonic, sulfonyl, sulfoxide, sulfinic, thio, cyclohexanedione, phenyl, naphthyl or heterocycles. Especially useful aromatic hydrocarbons include those having a nitro substituent at the pare or meta position. Examples of suitable heterocyclic groups include thiophene, pyridyl, thiazole, benzathiazole, pyrazole, indene, thiazolidine, oxazolidine, dioxanedione, and furanone, especially those compounds forming a heterocyclic structure with a carbon atom of the C=C pair; examples of electron donating groups include hydrogen, $C_1$–$C_4$ alkyl, phenyl or naphthyl which are substituted with amino, alkoxy, halo, amido, alkyl, trifluoromethyl, preferably at the para or ortho position; 1,2,3,4-tetrahydroquinolines; 2,3-dihydroindoles; 2,3-dihydro-1,4-benzoxazines(benzomorpholines); naphthylamines; 2-aminothiophenes; phenols; naphthols; 2-aminothiazoles; indoles; imidazothiazoles; 5-pyrazolones; 2-pyridones or acetoacetarylides. Unless otherwise specified the alkyl, alkoxy and alkyl ester groups comprise from 1 to 12 carbon atoms, preferably from 1 to 4.

The chromogen is covalently bonded to the poly(oxyalkylene) substituent by a linking group selected from N, NR, 0, S, $S_2$, $SO_2N$, $SO_2NR$, $CO_2$, CON or CONR, where R is H, $C_1$–$C_{12}$ alkyl, phenyl or benzyl. Preferably, the linking group is N, NR, O, $SO_2N$ or $SO_2NR$. Two poly(oxyalkylene) substituents may be bonded to the chromophore through a trivalent linking group. The number of poly(oxyalkylene) chains per chromophore may be from 1–6, preferably 1–4, most preferably 1, 2 or 3.

The poly(oxyalkylene) substituent may be characterized as a straight or branched chain of from 2–200 residues of $C_2$–$C_4$alkylene oxides. In a preferred embodiment, the poly(oxyalkylene) substituents are primarily comprised of from 4 to 100, most preferably 8 to 75, residues of ethyleneoxide, propyleneoxide or random and block copolymers thereof. Minor amounts of glycidol, butylene oxide and other compatible monomers may also be incorporated into the substituent. For example, glycidol monomers may be incorporated into the poly(oxyalkylene) substituent to promote branching. When enhanced branching is desired, preferably from 2 to 10 glycidol units are provided per poly(oxyalkylene) chain.

The precise identity of the end group of the poly(oxyalkylene) substituent is not believed to be critical insofar as the functioning of the colorant is concerned. For example, the end group may be selected from:

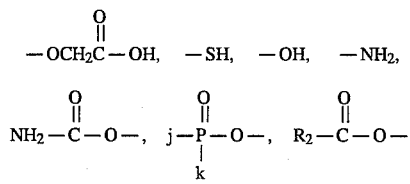

and sulfonates and sulfates of each of the members of said group, wherein $R_2$ is H, an alkyl radical containing up to about 20 carbon atoms or carboxy-terminated alkyl radical containing up to about 20 carbon atoms, j and k are OH, OM or $OR_3$, wherein M is a cation moiety of an alkali metal, an alkaline earth metal, transition metal, e.g., nickel, etc. or ammonium, and $R_3$ is an alkyl radical containing up to about 20 carbon atoms. In a preferred embodiment, the end group is —OH or acetyl.

The solubility of the poly(oxyalkylene) substituted colorant may be varied by the relative hydrophilic/oleophilic character of the poly(oxyalkylene) substituent and the end group, and the presence or absence of ionic groups on the colorant molecule.

Synthesis of organic chromogens containing poly(oxyalkylene) substituents are disclosed in Moore et al., U.S. Pat. No. 4,594,454 and Kluger et al., U.S. Pat. No. 4,981,516, both of which are incorporated by reference.

The poly(oxyalkylene) methine colorants useful in the present invention may be identified by the following general structure:

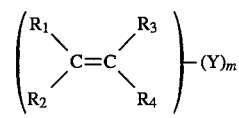

$R_1$ and $R_2$ are selected from nitro, amido, halo, cyano, carbonyl, carboxy, alkyl ester, vinylic carbon, sulfonic, sulfonyl, sulfoxide, sulfinic, thio, cyclohexane-dione, phenyl, naphthyl and heterocyclic groups. Preferably, $R_1$ and $R_2$ are selected from nitro, amido, halo, cyano, carbonyl, carboxy, $C_1$–$C_4$ alkyl ester, vinylic carbon, sulfonic, and nitro substituted phenyl or $R_1$ and $R_2$ together form a thiophene, pyridyl, thiazole, benzathiazole, pyrazole, indane, thiazolidine, oxazolidine or furanone heterocyclic group. $R_3$ is hydrogen or $C_1$–$C_4$ alkyl, preferably hydrogen. $R_4$ is phenyl or naphthyl substituted with amino, alkoxy, halogen, amido, alkyl, or trifluoromethyl, 1,2,3,4-tetrahydroquinolines; 2,3-dihydroindoles; 2,3-dihydro-1,4-benzoxazines(benzomorpholines); naphthylamines; 2-aminothiophenes; phenols; naphthols; 2-aminothiazoles; indoles, imidazothiazoles; 5-pyrazolones; 2-pyridones or acetoacetarylides, preferably phenyl which has at least one substituent at the para or ortho position selected from amino, $C_1$–$C_4$ alkoxy, halo, or $C_1$–$C_4$ alkyl. Y is a poly(oxyalkylene) substituent covalently bonded to $R_1$, $R_2$, or $R_4$; m is an integer from 1 to 6. Preferably, 1, 2 or 3 of such poly(oxyalkylene) substituents are bonded to $R_4$. In a most preferred embodiment, $R_4$ is phenyl and at least two of such poly(oxyalkylene) substituents are bonded to an amino group at the pars position.

The poly(oxyalkylene) substituted methine colorants may be applied to textile fibers using any number of techniques well known to those skilled in the art. Typically, the colorant is diluted with water or other compatible solvent to give a concentration of about 0.2 to 60 wt. % colorant, preferably from 1 to 20 wt. % colorant, and the solution is applied to the fibers by spraying, dipping or by a kiss roll. The solvent is evaporated leaving the colorant at an add on of approximately 0.01 to 3 wt. %, preferably 0.05 to 1.0 wt. %, based on the weight of the fiber. The fiber is then ready for additional textile processing steps.

The process of the present invention is adapted to textile fibers which eventually undergo a heat setting step, in particular heat setting with superheated steam or conditions of high heat and humidity. Heat setting is employed to provide crimp in a fiber and to retain the shape and twist of plied fibers and yarns. Previous experience with thermoplastic fibers which have been tinted with fugitive colorants has demonstrated that such conditions of high heat and humidity will cause the colorant to migrate into the interstices in the fiber and become permanently bound thereto. Similar difficulties can be anticipated with other types of fibers.

Advantageously, the methine colorants of the present invention may be decolorized during typical wet heat setting processes employing superheated steam. Thus, even though the colorant may become permanently bound to a fiber, a degradation and a color loss occurs resulting in no visible trace of the colorant. For typical polyamide fibers, heating with superheated steam of a minimum temperature of 240° F. is recommended, preferably a temperature of 250° F. or greater is recommended, to affect decolorization of the subject methine colorant. In the present process, the tinted textile fiber is heated in a steam saturated environment or wet process, as distinguished from Suessen or other so-called dry heat processes. Of course, the conditions should not be so extreme as to cause melting or degradation of the fiber. In general, exposure of the fiber to the superheated steam for 10 to 15 seconds is sufficient to raise the surface temperature of the fiber and achieve decolorization. Most heatsetting applications involve exposure of the fiber to the superheated steam for 30 to 120 seconds, usually at least 45 seconds, to raise the core of the fiber above the softening temperature of the polymer.

In one typical commercial process, nylon fiber is heatset using the Superba process. Briefly, a yarn made from the fiber is pre-steamed at about 208° F. to increase bulk, followed by heatsetting at about 250°–300° F., depending on the fiber type, for about 90 seconds in a heatsetting chamber with superheated steam, and finally the yarn is dried and taken up. Nylon 6 is typically treated at temperatures of 250°–280° F., while nylon 6,6 is usually treated at a 10°–20° F. higher temperature.

In another alternative process, heatsetting with superheated steam is accomplished in an autoclave. A typical commercial cycle for nylon 6 fiber is as follows:
Autoclave Conditions:

| Prevacuum | 1 min |
|---|---|
| Low Steam | 5 min, 2 cycles, 230° F. |
| High Steam | 5 min, 2 cycles, 270° F. |
| 2nd High Steam | 8 min, 270° F. |
| Post Vacuum | 8 min |
| Door Open | 1 min |

The invention may be further understood by reference to the following examples, but the invention is not to be construed as being unduly limited thereby. Unless otherwise indicated, all parts and percentages are by weight.

EXAMPLE 1

Synthesis of N,N-bis(hydroxyethylpolyoxyethylene)aniline (I)

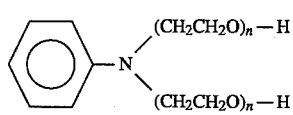

n = 50

Ninety three grams of aniline are allowed to react with 4000 grams ethylene oxide in the presence of potassium hydroxide following well known ethoxylation procedures. About 100 molar equivalents of ethylene oxide are thus added to the starting material.

Using similar procedures, the following poly(oxyalkylene) substituted intermediates were synthesized.

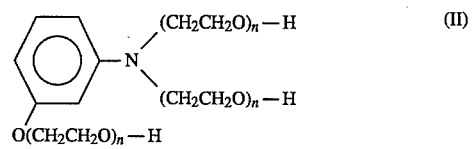

n = 33.3

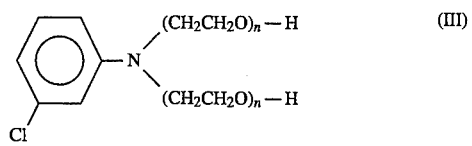

n = 15

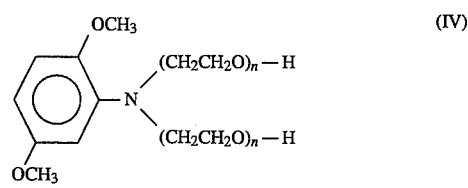

n = 10

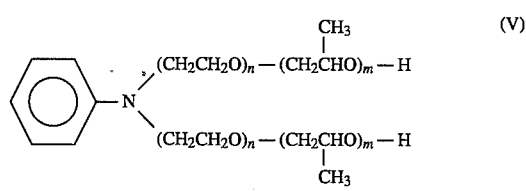

m = 15, n = 15

The following example demonstrates the incorporation of glycidol to increase branching in the poly(oxyalkylene) substituent.

EXAMPLE 2

Synthesis of N,N-bis(hydroxyethylpolyoxyethylene, polyoxypropylene, polyglycidol)-m-chloroaniline (VI)

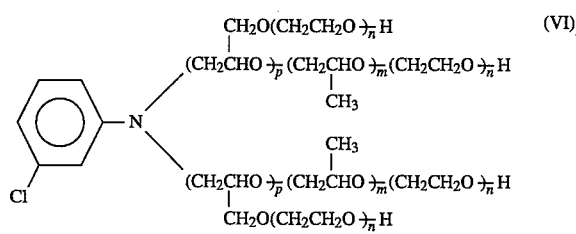

m = 2, n = 100, p = 2

One hundred twenty seven grams of m-chloroaniline were allowed to react with 296 grams glycidol by heating the m-chloroaniline to 130° C. and dripping the glycidol in slowly under nitrogen atmosphere. The product was then allowed to react with 232 grams propylene oxide followed by 8800 grams ethylene oxide in the presence of potassium hydroxide following well known ethoxylation procedures.

About 4 molar equivalents of propylene oxide and 200 molar equivalents of ethylene oxide were thus added to the starting material. Using similar procedures, the following poly(oxyalkylene) substituted intermediates were synthesized.

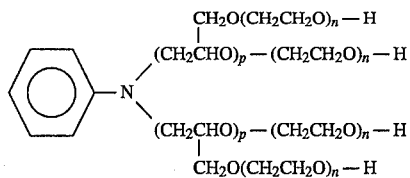

n = 100, p = 2

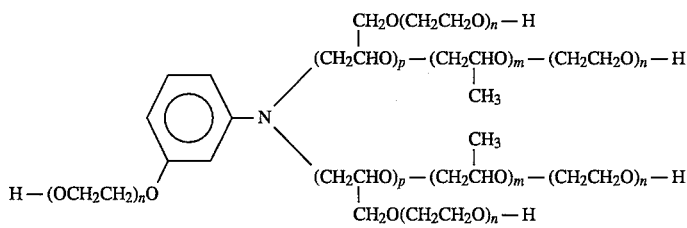

m = 2, n = 100, p = 2

The following examples demonstrate synthesis of the aldehyde from the corresponding poly(oxyalkylene) substituted intermediate.

EXAMPLE 3

Synthesis of N,N-bis(acetoxyethylpolyoxyethylene)-4-formylaniline

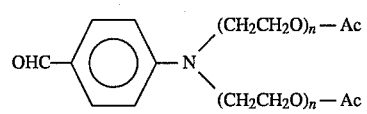

n = 50

Two hundred twenty grams of N,N-bis(hydroxyethylenepolyoxyethylene)aniline (I, where n=50) were heated in a three liter, three-necked, round-bottomed flask until the material had melted. 20 grams acetic anhydride was added to the molten material which was then heated at 100° C. and stirred for two hours. The product was then cooled and 50 mL water was added. The reaction mixture was vacuum stripped to dryness. Two hundred grams of the dried product and 100 grams N,N-dimethylformamide were charged to a three liter, three-necked, round-bottomed flask and heated to 44° C. under a nitrogen atmosphere. Seventy-five grams phosphorus oxychloride were then charged dropwise to the reaction mixture. The mixture was continuously stirred and the temperature was kept below 47° C. throughout the entire addition. The reaction was heated to 90° C. and held there for 1.5 hours. The reaction mixture was then cooled to 40° C. and then neutralized slowly with caustic. The product mixture was then vacuum stripped to dryness.

Similarly, the following aldehydes were synthesized.

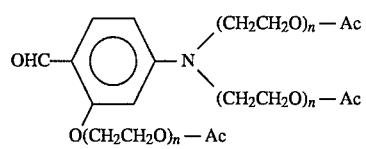

n = 33.3

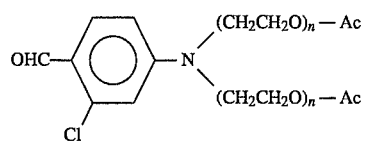

n = 15

-continued
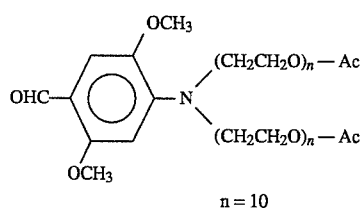
n = 10
(XII)
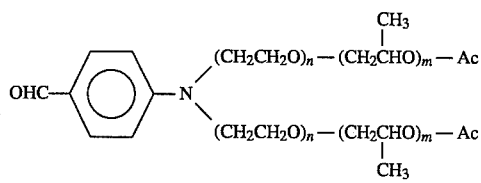
m = 15, n = 15
(XIII)
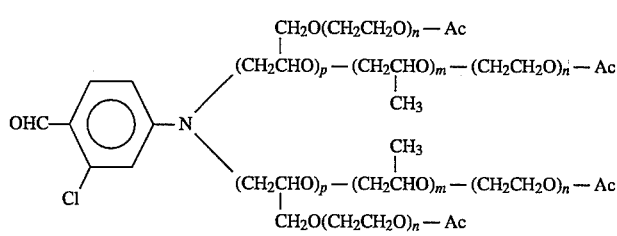
m = 2, n = 100, p = 2
(XIV)
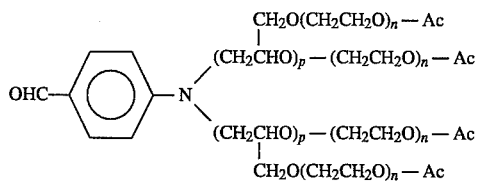
m = 2, n = 100
(XV)
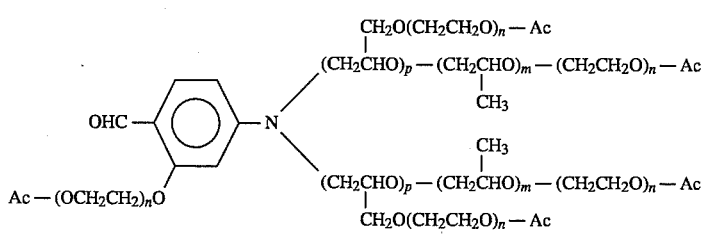
m = 2, n = 100, p = 2
(XVI)
EXAMPLE 4
Synthesis of 2-(4-bis(polyoxyethyleneacetate)aminophenyl)ethenyl-2,4-dinitrobenzene.
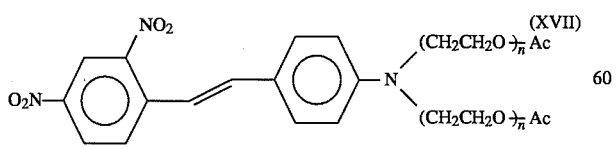
n = 50
2,4-Dinitrobenzene (3.6 g) is condensed with 92 g of N,N-bis(acetoxyethylpolyoxyethylene)-4-formylaniline (IX) for 3 hours at 100° C., using morpholine (0.5 g) as catalyst. The orange product is cut to the proper absorptivity and bottled.

EXAMPLE 5

Synthesis of 2-(4-bis(polyoxyethyleneacetate)aminophenyl)ethenyl-3,5-dinitro-o-toluic acid.

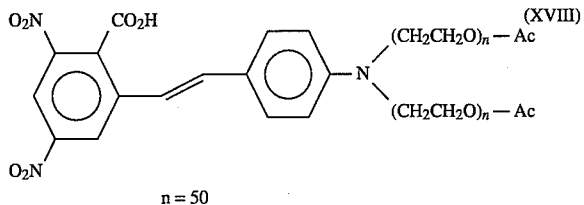

n = 50

3,5-Dinitro-o-toluic acid (4.5 g) is condensed with 92 g of N,N-bis(acetoxyethylpolyoxyethylene)-4-formylaniline (IX) for 3 hours at 100° C., using morpholine (2.3 g) as catalyst. The yellow product is cut to the proper absorptivity and bottled.

EXAMPLE 6

Synthesis of 4-(2,2-dicyanoethenyl)-N,N-bis(acetoxyethylpolyoxyethylene, polyoxypropylene)aniline.

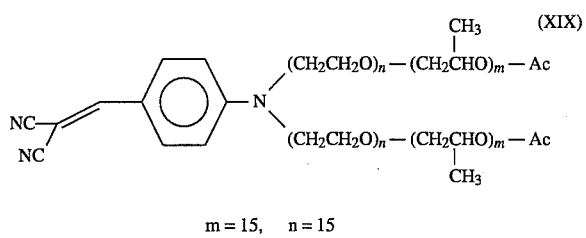

m = 15, n = 15

N,N-bis(acetoxyethylpolyoxyethylene, polyoxypropylene)-4-formylaniline (XIII), 59.6 g, was condensed with 1.3 g malononitrile for 3 hours at 100° C., using morpholine (0.5 g) as catalyst. The yellow product is cut to the proper absorptivity and bottled.

EXAMPLE 7

Synthesis of 5-(2-(4-bis(polyoxyethylene, Polyoxypropyleneacetate)aminophenyl)ethenyl)-2-thioxo-4-thiazolidinone.

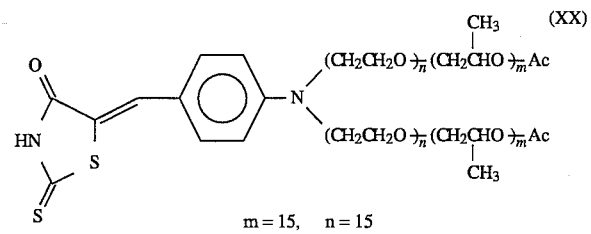

m = 15, n = 15

N,N-bis(acetoxyethylpolyoxyethylene, polyoxypropylene)-4formylaniline (XIII), 59.6 g, was condensed with 2.7 g rhodamine for 3 hours at 100° C., using morpholine (0.5 g) as catalyst. The yellow product is cut to the proper absorptivity and bottled.

EXAMPLE 8

Synthesis of 2-(2-(4-bis(polyoxyethylene, Polyoxypropyleneacetate)aminophenyl)ethenyl)-1,3-indandione

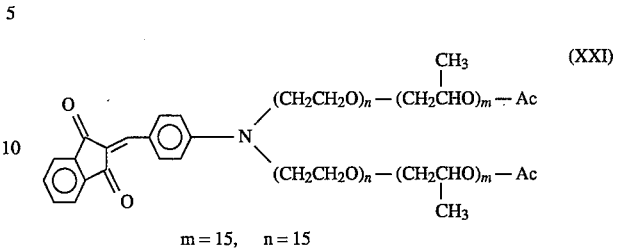

m = 15, n = 15

N,N-bis(acetoxyethylpolyoxyethylene, polyoxypropylene)-4formylaniline (XIII), 59.6 g, was condensed with 2.9 g 1,3-indandione for 3 hours at 100° C., using morpholine (0.5 g) as catalyst. The orange product is cut to the proper absorptivity and bottled.

EXAMPLE 9

Synthesis of 4-(2-(4-bis(polyoxyethylene, polyoxypropyleneacetate)aminophenyl)ethenyl)-3-methyl-1-phenyl-2-pyrazolin-5-one.

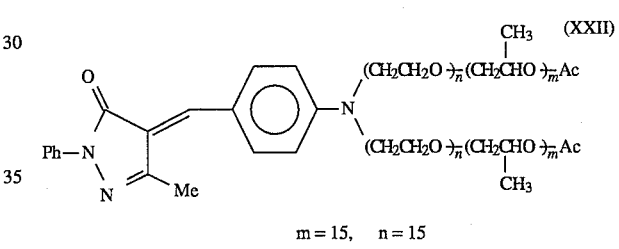

m = 15, n = 15

N,N-bis(acetoxyethylpolyoxyethylene, polyoxypropylene)-4formylaniline (XIII), 59.6 g, was condensed with 3.5 g 3-methyl1-phenyl-2-pyrazolin-5-one for 3 hours at 100° C., using morpholine (0.5 g) as catalyst. The yellow product is cut to the proper absorptivity and bottled.

EXAMPLE 10

Synthesis of 4-(2-(4-nitrophenyl)-2-cyanoethenyl)-N,N-bis(acetoxyethylpolyoxyethylene, polyoxypropylene)aniline.

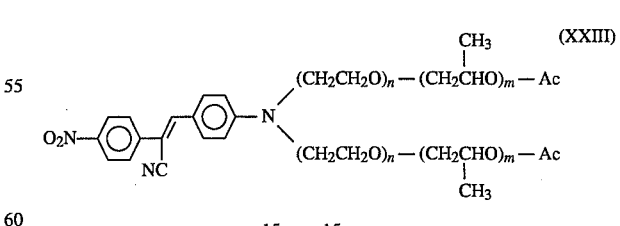

m = 15, n = 15

N,N-bis(acetoxyethylpolyoxyethylene, polyoxypropylene)-4-formylaniline (XIII, where n=15, m=15), 59.6 g, was condensed with 3.2 g 4-nitrophenylacetonitrile for 3 hours at 100° C., using morpholine (0.5 g) as catalyst. The yellow product is cut to the proper absorptivity and bottled.

EXAMPLE 11

Synthesis of 2-(4-bis(polyoxyethylene, polyoxypropyleneacetate)aminophenyl)ethenyl-3,5-dinitro-o-toluic acid.

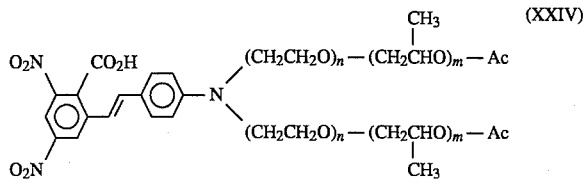

m = 15, n = 15

N,N-bis(acetoxyethylpolyoxyethylene, polyoxypropylene)-4-formylaniline (XIII), 59.6 g, was condensed with 4.5 g 3,5-dinitro-o-toluic acid for 3 hours at 100° C., using morpholine (2.3 g) as catalyst. The yellow product is cut to the proper absorptivity and bottled.

EXAMPLE 12

Synthesis of 5-(2-(4-bis(polyoxyethylene, polyoxypropyleneacetate)aminophenyl)ethenyl)-2,4-thiazolidinedione.

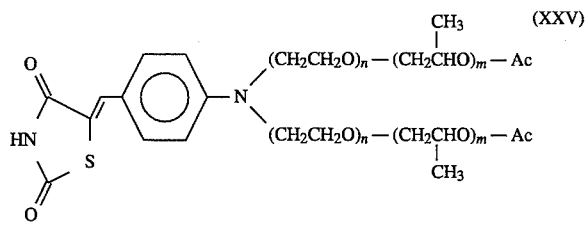

m = 15, n = 15

N,N-bis(acetoxyethylpolyoxyethylene, polyoxypropylene)-4-formylaniline (XIII), 59.6 g, was condensed with 2.3 g 2,4-thiazolidinedione for 3 hours at 100° C., using morpholine (0.5 g) as catalyst. The yellow product is cut to the proper absorptivity and bottled.

EXAMPLE 13

Synthesis of 2-(2-(4-bis(polyoxyethylene, polyoxypropyleneacetate)aminophenyl)ethenyl)-acetoacetanilide.

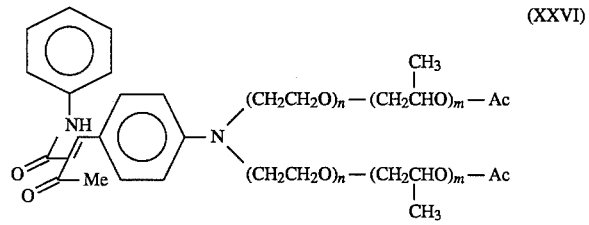

m = 15, n = 15

N,N-bis(acetoxyethylpolyoxyethylene, polyoxypropylene)-4-formylaniline (XIII), 59.6 g, was condensed with 3.5 g acetoacetanilide for 3 hours at 100° C., using morpholine (0.5 g) as catalyst. The yellow product is cut to the proper absorptivity and bottled.

EXAMPLE 14

Synthesis of 2-(2-(4-bis(polyoxyethylene, polyoxypropyleneacetate)aminophenyl)ethenyl)-o-acetoacetanisidide.

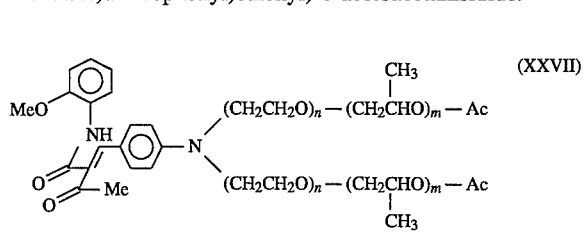

m = 15, n = 15

N,N-bis(acetoxyethylpolyoxyethylene, polyoxypropylene)-4-formylaniline (XIII, where n=15, m=15), 59.6 g, was condensed with 4.1 g o-acetoacetanisidide for 3 hours at 100° C., using morpholine (0.5 g) as catalyst. The yellow product is cut to the proper absorptivity and bottled.

EXAMPLE 15

Synthesis of 2-(2-(4-bis(polyoxyethylene, polyoxypropyleneacetate)aminophenyl)ethenyl)-cyanoacetic acid.

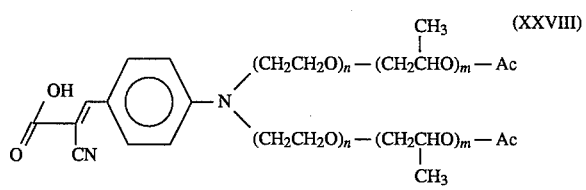

m = 15, n = 15

N,N-bis(acetoxyethylpolyoxyethylene, polyoxypropylene)-4-formylaniline (XIII, where n=15, m=15), 59.6 g, was condensed with 1.7 g cyanoacetic acid for 3 hours at 100° C., using morpholine (2.3 g) as catalyst. The yellow product is cut to the proper absorptivity and bottled.

EXAMPLE 16

Synthesis of 2-(2-(4-bis(polyoxyethylene, polyoxypropyleneacetate)aminophenyl)ethenyl)-2-cyanoacetamide.

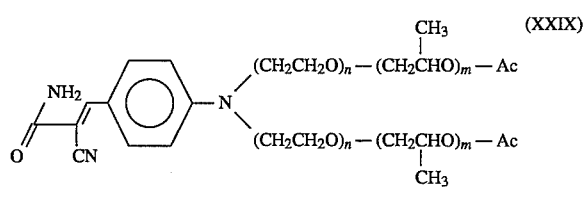

m = 15, n = 15

N,N-bis(acetoxyethylpolyoxyethylene, polyoxypropylene)-4-formylaniline (XIII, where n=15, m=15), 59.6 g, was condensed with 1.7 g 2-cyanoacetamide for 3 hours at 100° C., using morpholine (0.5 g) as catalyst. The yellow product is cut to the proper absorptivity and bottled.

EXAMPLE 17

Synthesis of 2-(2-(4-bis(polyoxyethylene, polyoxypropyleneacetate)aminophenyl)ethenyl)-5,5-dimethyl-1,3-cyclohexanedione.

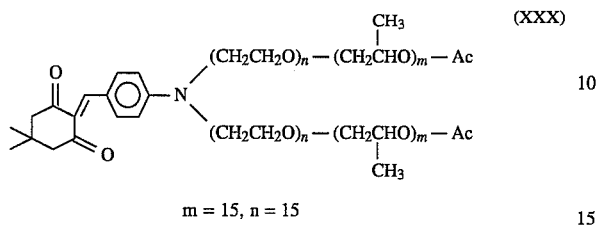

(XXX)

m = 15, n = 15

N,N-bis(acetoxyethylpolyoxyethylene, polyoxypropylene)-4-formylaniline (XIII, where n=15, m=15), 59.6 g, was condensed with 2.8 g 5,5-dimethyl-1,3-cyclohexanedione for 3 hours at 100° C., using morpholine (0.5 g) as catalyst. The orange product is cut to the proper absorptivity and bottled.

EXAMPLE 18

Synthesis of 2-(2-(4-bis(polyoxyethylene, polyoxypropylene, polyglycidolacetate)amino-m-chlorophenyl)ethenyl)-1,3-indandione.

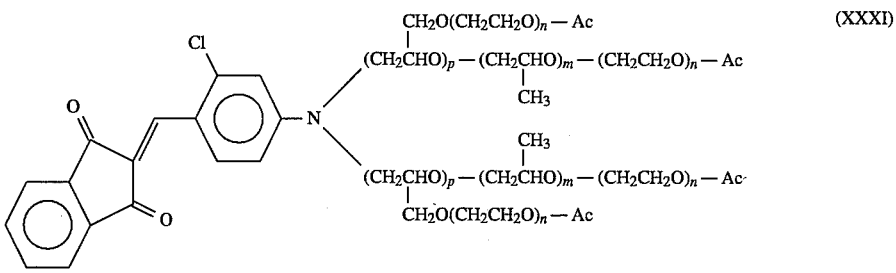

(XXXI)

m = 2, n = 100, p = 2

N,N-bis(acetoxyethylpolyoxyethylene, polyoxypropylene, polyglycidol)-4-formyl-m-chloroaniline (XIV, where n=100, m=2, p=2), 102 g, was condensed with 1.6 g 1,3-indandione for 3 hours at 100° C., using morpholine (0.5 g) as catalyst. The red product is cut to the proper absorptivity and bottled.

EXAMPLE 19

Synthesis of 4-(2,2-dicyanoethenyl)-N,N-bis(acetoxypolyoxyethylene, polyoxypropylene, polyglycidol)-m-chloroaniline.

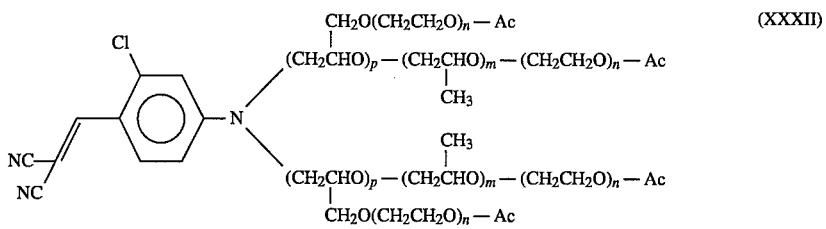

(XXXII)

m = 2, n = 95, p = 2

N,N-bis(acetoxyethylpolyoxyethylene, polyoxypropylene, polyglycidol)-4-formyl-m-chloroaniline (XIV, where n=95, m=2, p=2), 102 g, was condensed with 0.8 g malononitrile for 3 hours at 100° C., using morpholine (0.5 g) as catalyst. The yellow product is cut to the proper absorptivity and bottled.

EXAMPLE 20

Synthesis of 2-(2-(4-bis(polyoxyethylene, polyoxypropylene, polyglycidolacetate)-amino-m-chlorophenyl)ethenyl)-ethylcyanoacetate.

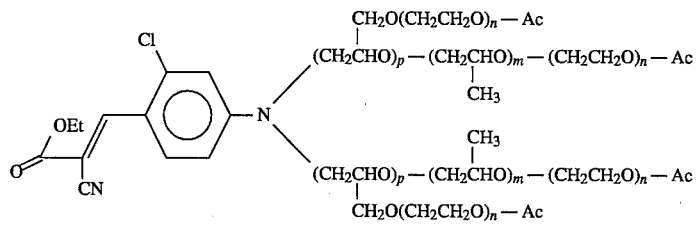

(XXXIII)

m = 2, n = 95, p = 2

N,N-bis(acetoxyethylpolyoxyethylene, polyoxypropylene, polyglycidol)-4-formyl-m-chloroaniline (XIV, where n=95, m=2, p=2), 93 g, was condensed with 1.1 g ethylcyanoacetate for 3 hours at 100° C., using morpholine (0.6 g) as catalyst. The yellow product is cut to the proper absorptivity and bottled.

EXAMPLE 21

Synthesis of 4-(2,2-dicyanoethenyl)-N,N,O-tris(acetoxy-polyoxyethylene, polyoxypropylene, polyglycidol)-m-aminophenol.

was condensed with 0.5 g malononitrile for 3 hours at 100° C., using morpholine (0.3 g) as catalyst. The yellow product is cut to the proper absorptivity and bottled.

EXAMPLE 22

Synthesis of 2-(2-(N,N,O-tris (polyoxyethylene, polyoxypropylene, polyglycidolacetate)-m-hydroxy-aminophenyl)ethenyl)-2-cyanoacetamide.

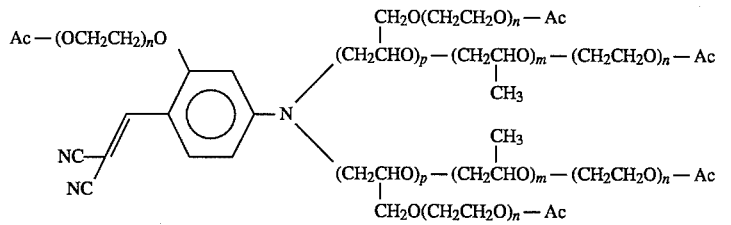

(XXXIV)

m = 2, n = 118, p = 2.5

N,N,O-tris(acetoxyethylpolyoxyethylene, polyoxypropylene, polyglycidol)-4-formyl-m-aminophenol (XVI), 57 g,

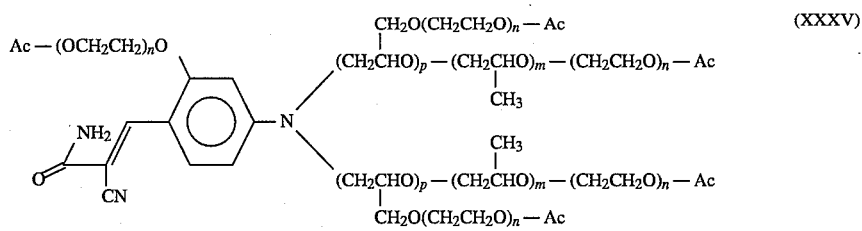

(XXXV)

m = 2, n = 118, p = 2.5

N,N,O-tris(acetoxyethylpolyoxyethylene, polyoxypropylene, polyglycidol)-4-formyl-m-aminophenol (XVI), 57 g, was condensed with 0.5 g 2-cyanoacetamide for 3 hours at 100° C., using morpholine (0.4 g) as catalyst. The yellow product is cut to the proper absorptivity and bottled.

EXAMPLE 23

Synthesis of 4-(2-(4-nitrophenyl)-2-cyanoethenyl)-N,N,O-tris(acetoxyethylpolyoxyethylene, polyoxypropylene, polyglycidol)-m-hydroxyaniline.

was condensed with 0.7 g 1,3-indanedione for 3 hours at 100° C., using morpholine (0.3 g) as catalyst. The red product is cut to the proper absorptivity and bottled.

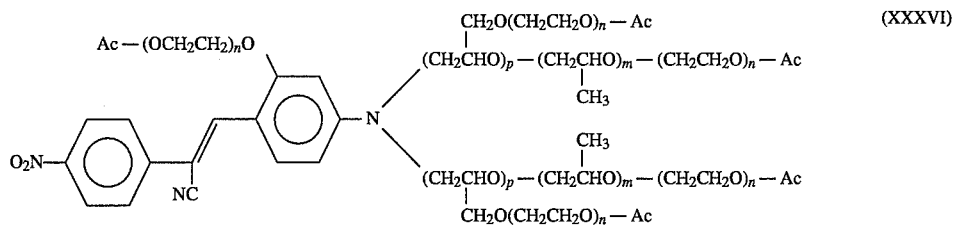

(XXXVI)

n = 118, m = 2, p = 2.5

N,N,O-tris(acetoxyethylpolyoxyethylene, polyoxypropylene, polyglycidol)-4-formyl-m-aminophenol (XVI), 57 g, was condensed with 0.8 g 4-nitrophenylacetonitrile for 3 hours at 100° C., using morpholine (0.3 g) as catalyst. The yellow product is cut to the proper absorptivity and bottled.

EXAMPLE 24

Synthesis of 2-(2-(N,N,O-tris(polyoxyethylene, polyoxypropylene, polyglycidolacetate)-m-hydroxy-aminophenyl)ethenyl)-1,3-indanedione.

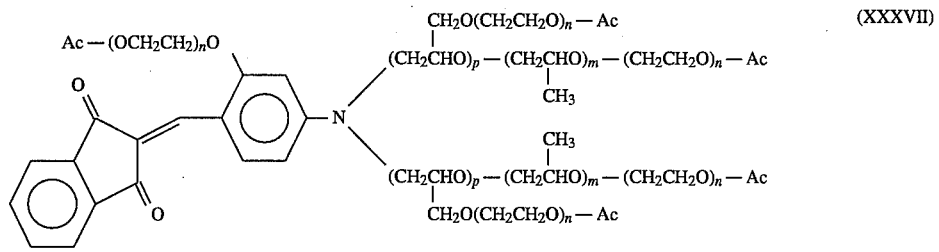

(XXXVII)

n = 118, m = 2, p = 2.5

N,N,O-tris(acetoxyethylpolyoxyethylene, polyoxypropylene, polyglycidol)-4-formyl-m-aminophenol (XVI), 57 g,

EXAMPLE 25

Synthesis of 2-(2-(4bis(polyoxyethyleneacetate) aminophenyl)ethenyl)-1,3-indandione.

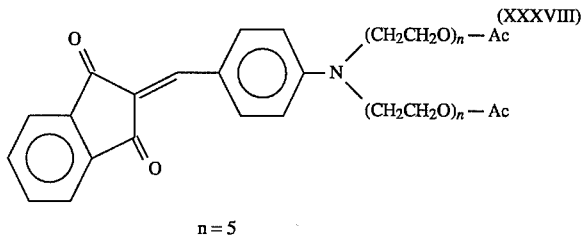

n = 5

N,N-bis(acetoxyethylpolyoxyethylene)-4-formylaniline (IX), 129 g, was condensed with 29.2 g 1,3-indandione for 3 hours at 100° C., using morpholine (1.0 g) as catalyst. The orange product is cut to the proper absorptivity and bottled.

EXAMPLE 26

Synthesis of 2-(2-(4-bis(polyoxyethyleneacetate) amino-m-chlorophenyl) ethenyl)-1,3-indandione.

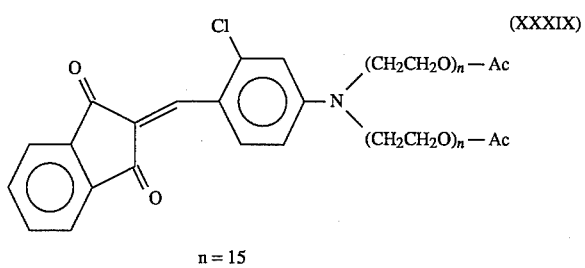

n = 15

N,N-bis(acetoxyethylpolyoxyethylene)-4-formyl-m-chloroaniline (XI), 116 g, was condensed with 11.5 g 1,3-indandione for 3 hours at 100° C., using morpholine (0.5 g) as catalyst. The red product is cut to the proper absorptivity and

EXAMPLE 27

Synthesis of 2-(2-(4-bis(polyoxyethyleneacetate)-2,5-dimethoxy-aminophenyl) ethenyl)-ethylcyanoacetate.

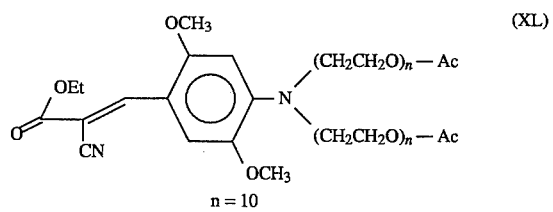

n = 10

N,N-bis(acetoxyethylpolyoxyethylene)-2,5-dimethoxy-4-formylaniline (XII), 115 g, was condensed with 11.3 g ethylcyanoacetate for 3 hours at 100° C., using morpholine (1.7 g) as catalyst. The yellow product is cut to the proper absorptivity and bottled.

EXAMPLE 28

Synthesis of 4-(2,2-dicyanoethenyl)-2,5-dimethoxy-N,N-bis(acetoxyethylpolyoxyethylene)aniline.

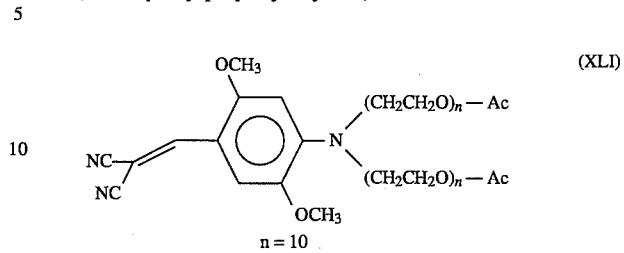

n = 10

N,N-bis(acetoxyethylpolyoxyethylene)-2,5-dimethoxy-4-formylaniline (XII, where n=10), 115 g, was condensed with 6.6 g malononitrile for 3 hours at 100° C., using morpholine (1.7 g) as catalyst. The yellow product is cut to the proper absorptivity and bottled.

EXAMPLE 29

Synthesis of 5-(2-(4-bis(polyoxyethyleneacetate)-2,5-dimethoxy-aminophenyl) ethenyl)-2,2-dimethyl-1,3-dioxane-4,6-dione

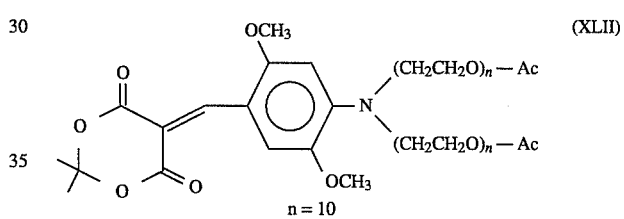

n = 10

N,N-bis(acetoxyethylpolyoxyethylene)-2,5-dimethoxy-4-formylaniline (XII), 115 g, was condensed with 14.4 g 2,2-dimethyl-1,3-dioxane-4,6-dione for 3 hours at 100° C., using morpholine (1.7 g) as catalyst. The orange product is cut to the proper absorptivity and bottled.

EXAMPLE 30

Synthesis of 2-(2-(4-bis(polyoxyethyleneacetate)-2,5-dimethoxy-aminophenyl) ethenyl)-1,3-indandione.

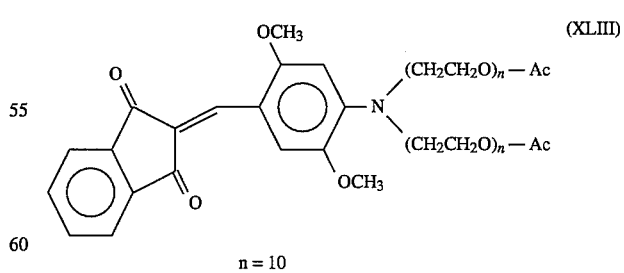

n = 10

N,N-bis(acetoxyethylpolyoxyethylene)-2,5-dimethoxy-4-formylaniline (XII), 115 g, was condensed with 14.6 g 1,3-indandione for 3 hours at 100° C., using morpholine (1.7 g) as catalyst. The red product is cut to the proper absorptivity and bottled.

EXAMPLE 31

Synthesis of 4-(2,2-dicyanoethenyl)-N,N-bis(acetoxyethylpolyoxyethylene)aniline.

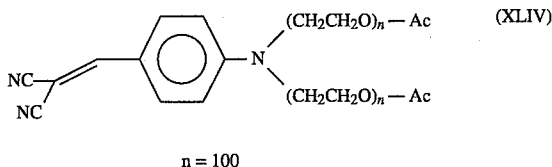

n = 100

N,N-bis(acetoxyethylpolyoxyethylene)-4-formylaniline (IX), 89 g, was condensed with 0.7 g malononitrile for 3 hours at 100° C., using morpholine (0.5 g) as catalyst. The yellow product is cut to the proper absorptivity and bottled.

EXAMPLE 32

Synthesis of 4-(2-(4-nitrophenyl)-2-cyanoethenyl)-N,N-bis(acetoxyethylpolyoxyethylene) aniline.

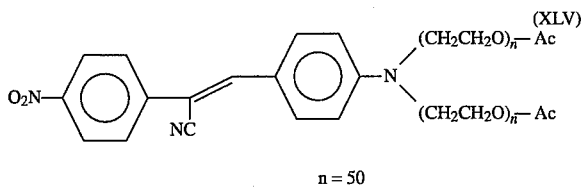

n = 50

N,N-bis(acetoxyethylpolyoxyethylene)-4-formylaniline (IX), 150 g, was condensed with 5.3 g 4-nitrophenylacetonitrile for 3 hours at 100° C., using morpholine (0.5 g) as catalyst. The yellow product is cut to the proper absorptivity and bottled.

EXAMPLE 33

Synthesis of 4 -(2-(4-bis(polyoxyethylene)aminophenyl)ethenyl)-3-methyl- 1-phenyl-2-pyrazolin-5-one.

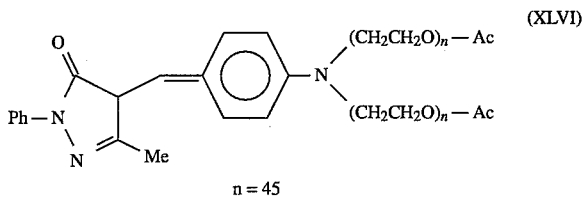

n = 45

N,N-bis(acetoxyethylpolyoxyethylene)-4-formylaniline (IX), 124 g, was condensed with 5.2 g 3-methyl-1-phenyl-2-pyrazolin-5-one for 3 hours at 100° C., using morpholine (0.5 g) as catalyst. The yellow product is cut to the proper absorptivity and bottled.

EXAMPLE 34

Synthesis of 2-(2-(4-bis (polyoxyethyleneacetate)aminophenyl)ethenyl)-ethylcyanoacetate

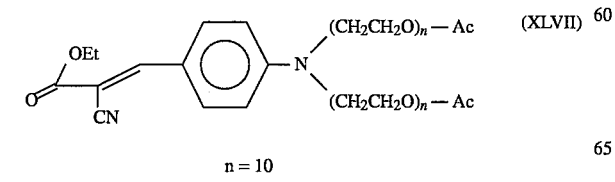

n = 10

N-N-bis(acetoxyethylpolyoxyethylene)-4-formylaniline (IX), 11.8 g, was condensed with 1.1 g ethylcyanoacetate for 3 hours at 100° C., using morpholine (0.6 g) as catalyst. The yellow product is cut to the proper absorptivity and bottled.

The colorants (tints) were tested on Allied-Signal, Inc. nylon 6 fiber (Type 715, 15 denier staple) by spraying a 2 wt. % solution of colorant in water and drying (under ambient conditions/oven) to leave approximately 0.5 wt. % add on of colorant, based on the dry weight of the fiber. Next, the colored fiber was subjected to heatsetting procedures in an autoclave following the cycle outlined below.

Autoclave Conditions:

| | |
|---|---|
| Prevacuum | 1 min |
| Low Steam | 5 min, 2 cycles, 230° F. |
| High Steam | 5 min, 2 cycles, 270° F. |
| 2nd High Steam | 8 min, 270° F. |
| Post Vacuum | 8 min |
| Door Open | 1 min |

The fibers were graded "no fading" if the coloration remained on the fiber, and "faded" if the coloration of the fiber was essentially unnoticeable by visual observation.

The subject methine colorants were then compared to the Versatint® textile fiber tints available from Milliken Chemical, a division of Milliken & Company, Spartanburg, S.C., USA, which represent the state of the art for fugitive tints.

TABLE 1

| Tint | Chromophore Type | Results |
|---|---|---|
| Yellows | | |
| Versatint ® Yellow II | azo | no fading |
| Structures XVIII | methine | faded |
| Structures XIX | methine | faded |
| Structures XX | methine | faded |
| Structures XXI | methine | faded |
| Structures XXII | methine | faded |
| Structures XXIII | methine | faded |
| Structures XXIV | methine | faded |
| Structures XXV | methine | faded |
| Structures XXVI | methine | faded |
| Structures XXVII | methine | faded |
| Structures XXVIII | methine | faded |
| Structures XXIX | methine | faded |
| Structures XXX | methine | faded |
| Structures XXXI | methine | faded |
| Structures XXXII | methine | faded |
| Structures XXXIII | methine | faded |
| Structures XXXIV | methine | faded |
| Structures XXXV | methine | faded |
| Structures XXXVI | methine | faded |
| Structures XXXVII | methine | faded |
| Structures XXXVIII | methine | faded |
| Structures XXXIX | methine | faded |
| Structures XL | methine | faded |
| Structures XLI | methine | faded |
| Structures XLII | methine | faded |
| Structures XLIII | methine | faded |
| Structures XLIV | methine | faded |
| Structures XLV | methine | faded |
| Structures XLVI | methine | faded |
| Structures XLVII | methine | faded |
| Oranges | | |
| Versatint ® Orange II | azo | no fading |
| Structures XVII | methine | faded |
| Structures XXI | methine | faded |
| Structures XXX | methine | faded |
| Structures XXXVIII | methine | faded |
| Structures XLII | methine | faded |

TABLE 1-continued

| Tint | Chromophore Type | Results |
|---|---|---|
| REDS | | |
| Versatint ® Red II | azo | no fading |
| Versatint ® Supra Red D | azomethine | no fading |
| Structure XXXI | methine | faded |
| Structure XXXVII | methine | faded |
| Structure XXXIX | methine | faded |
| Structure XLIII | methine | faded |

There are, of course, many alternate embodiments and modifications, which are intended to be included within the scope of the following claims.

What I claim is:

1. A method of providing temporary coloration to a polyamide substrate, comprising the steps of:
   (a) applying a poly(oxyalkylene) substituted methine colorant to said substrate wherein said colorant is characterized by a chromogen having a C=C pair, wherein the net effect of the groups bonded to one member of the pair is to donate electrons, and the net effect of the groups bonded to the opposite member of the pair is to withdraw electrons, with the proviso that the groups do not include a conjugated nitrogen bonded to one member of the C=C pair, and one of the electron donating groups is an aromatic or hetero-aromatic group, and from 1 to 6 poly(oxyalkylene) substituents having from 2 to 200 residues of $C_2$–$C_4$ alkylene oxides each covalently bonded to at least one of the electron donating groups or electron withdrawing groups by a linking group selected from the group consisting of N, NR, O, S, $SO_2$, $SO_2N$, $SO_2NR$, $CO_2$, CON and CONR, where R is H, $C_1$–$C_{12}$ alkyl phenyl or benzyl;
   (b) maintaining said colorant on said substrate to provide coloration for a desired length of time; and
   (c) thereafter heating said substrate with superheated steam to a temperature of 240° F. or more to degrade said colorant and decolorize said substrate.

2. The method of claim 1 wherein said substrate is a textile fiber and from 0.01 to 3 wt. % of said colorant is applied thereto.

3. The method of claim 1 wherein said substrate is a textile fiber and from 0.05 to 1 wt. % of said colorant is applied thereto.

4. The method of claim 3 wherein said textile fiber is selected from the group consisting of nylon 6 and nylon 6,6.

5. The method of claim 2 wherein said textile fiber is heated to a temperature of 250° F. or more for fifteen seconds.

6. The method of claim 5 wherein said colorant comprises from 1 to 3 of said poly(oxyalkylene) substituents, and wherein said substituents comprise from 4 to 100 residues of $C_2$–$C_4$ alkylene oxides each.

7. A method of providing temporary coloration to a polyamide substrate, comprising the steps of:
   (a) applying a poly(oxyalkylene) substituted methine colorant to said substrate wherein said colorant has the formula:

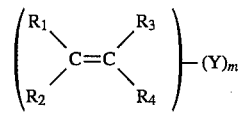

wherein $R_1$ and $R_2$ are selected from nitro, amido, halo, cyano, carbonyl, carboxy, alkyl ester, vinylic carbon, sulfonic, sulfonyl, sulfoxide, sulfinic, thio, cyclohexane-dione, phenyl and naphthyl, or $R_1$ and $R_2$ together form a thiophene, pyridyl, thiazole, benzathiazole, pyrazole, indane, thiazolidine, oxazolidine or furanone heterocyclic group; $R_3$ is hydrogen or $C_1$–$C_4$ alkyl; $R_4$ is phenyl or naphthyl substituted with amino, alkoxy, halogen, amido, alkyl, or trifluoromethyl, or a 1, 2, 3, 4-tetrahydroquinoline; 2,3-dihydroindole; 2,3-dihydro-1,4-benzoxazine (benzomorpholine); naphthylamine; 2-aminothiophene; phenol; naphthol; 2-aminothiazole; indole, imidazothiazole; 5-pyrazolone; 2-pyridone or acetoacetarylide; Y is a poly(oxyalkylene) substituent covalently bonded to $R_1$, $R_2$, or $R_4$ by a linking group selected from the group consisting of N, NR, O, S, $SO_2$, $SO_2N$, $SO_2NR$, $CO_2$, CON and CONR, where R is H, $C_1$–$C_{12}$ alkyl, phenyl or benzyl, Y having from 2 to 200 residues of $C_2$–$C_4$ alkylene oxides and m is an integer from 1 to 6;
   (b) maintaining said colorant on said substrate to provide coloration for a desired length of time; and
   (c) thereafter heating said substrate with superheated steam to a temperature of 240° F. or more, to degrade said colorant and decolorize said substrate.

8. The method of claim 7 wherein said substrate is a textile fiber and from 0.01 to 3 wt. % of said colorant is applied thereto.

9. The method of claim 7 wherein said substrate is a textile fiber and from 0.05 to 1 wt. % of said colorant is applied thereto.

10. The method of claim 9 wherein said textile fiber is selected from the group consisting of nylon 6 and nylon 6,6.

11. The method of claim 8 wherein said textile fiber is heated with superheated steam to a temperature of 250° F. or more for fifteen seconds.

12. The method of claim 8 wherein $R_1$ is selected from the group consisting of nitro, amido, halo, cyano, carbonyl, carboxy, $C_1$–$C_4$ alkyl ester, vinylic carbon, sulfonic, and nitro substituted phenyl, or $R_1$ and $R_2$ together form a thiophene, pyridyl, thiazole, benzathiazole, pyrazole, indane, thiazolidine, oxazolidine or furanone heterocyclic group; $R_3$ is hydrogen; $R_4$ is phenyl with at least one substituent at the para or ortho position selected from amino, $C_1$–$C_4$ alkoxy, halo, or $C_1$–$C_4$ alkyl; Y is bonded to $R_4$ and has from 4 to 100 residues of said alkylene oxides and m is 1, 2 or 3.

13. The method of claim 6 wherein said linking group is selected from the group consisting of N and O.

14. The method of claim 12 wherein said linking group is selected from the group consisting of N and O.

\* \* \* \* \*